US006954459B1

(12) United States Patent
Vaidhyanathan et al.

(10) Patent No.: US 6,954,459 B1
(45) Date of Patent: Oct. 11, 2005

(54) METHOD FOR FORWARDING BROADCAST PACKETS IN A BRIDGED IP NETWORK

(75) Inventors: Natarajan Vaidhyanathan, Durham, NC (US); Deepak Vig, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 695 days.

(21) Appl. No.: 09/596,244

(22) Filed: Jun. 16, 2000

(51) Int. Cl.[7] .............................................. H04L 12/28
(52) U.S. Cl. ...................................... 370/392; 370/474
(58) Field of Search ................................ 370/229, 230, 370/235, 252, 253, 351, 360, 378–393, 471–474, 370/475

(56) References Cited

U.S. PATENT DOCUMENTS

| 4,769,814 A | | 9/1988 | Bederman et al. ............. 370/85 |
| 5,323,394 A | | 6/1994 | Perlman .................. 370/85.13 |
| 5,421,024 A | | 5/1995 | Faulk, Jr. et al. ........... 395/800 |
| 5,430,728 A | | 7/1995 | Narayanan et al. ...... 370/85.13 |
| 5,604,867 A | | 2/1997 | Harwood ............... 395/200.13 |
| 5,930,259 A | * | 7/1999 | Katsube et al. ............. 370/409 |
| 6,147,976 A | * | 11/2000 | Shand et al. ................ 370/254 |
| 6,181,698 B1 | * | 1/2001 | Hariguchi ................... 370/392 |
| 6,192,051 B1 | * | 2/2001 | Lipman et al. ............. 370/389 |
| 6,208,649 B1 | * | 3/2001 | Kloth ......................... 370/392 |
| 6,337,862 B1 | * | 1/2002 | O'Callaghan et al. ...... 370/392 |
| 6,401,130 B1 | * | 6/2002 | Cain .......................... 709/245 |
| 6,674,760 B1 | * | 1/2004 | Walrand et al. ............. 370/411 |

OTHER PUBLICATIONS

IBM Technical Disclosure Bulletin, 01-92, pp. 68-71, "Scoping Multicasts in WAN Interconnected Local Networks".

* cited by examiner

*Primary Examiner*—Dang Ton
*Assistant Examiner*—Phuc Tran
(74) *Attorney, Agent, or Firm*—Joscelyn G. Cockburn

(57) ABSTRACT

A method for automatically generating a network subnet configuration, monitors IP Address Resolution Protocol (ARP) frames on the network and builds and maintains a table which includes a list of learned subnets, the ports or forwarding domain associated with each of the learned subnets and a mask associated with each learned subnet for identifying hosts belonging to the subnet. The from and to IP addresses from intercepted IP ARP frames are examined to determine if the IP addresses belong in any of the learned subnets. If neither IP address belongs to an existing learned subnet a new learned subnet is established. The subnet includes the common prefix bits of both IP addresses, a mask identifying those bits and the port over which the ARP frame was received. If only one IP address belong to a learned subnet, the mask associated with that subnet is modified to include the common prefix bits of both IP addresses and the forwarding domain is adjusted. If the two IP addresses belong to different learned subnets, the two subnets are combined.

7 Claims, 4 Drawing Sheets

FIG. 2

| LEARNED SUBNET | ADDR. | MASK | PORTS | SPLIT POTENTIAL |
|---|---|---|---|---|
| A | | | | |
| ⋮ | ⋮ | ⋮ | ⋮ | ⋮ |
| n | | | | |

METHOD FOR FORWARDING BROADCAST PACKETS IN A BRIDGED IP NETWORK

FIELD OF THE INVENTION

The invention relates to bridged Internet Protocol (IP) networks or their functional equivalent and more particularly to a process for handling IP broadcast data packets which reduces or avoids broadcast storms which cause network instability by indiscriminate flooding the network with IP broadcast frames.

BACKGROUND

In medium to large size bridged IP networks hosts belonging to a substantial number of different subnets communicate with hosts belonging to their subnet. In most networks hosts belonging to the same subnet are typically connected to a small percentage of the total number of ports. This topology characteristic contributes to broadcast storms and/or network instability when IP broadcast frames are indiscriminately transmitted. Prior art networks have avoided this problem by configuring the network bridges in advance to direct IP broadcast frames to only those ports associated with the subnet address associated with the source host of the IP broadcast message.

While this solution works to eliminate the problem described above, it introduces another which is just as burdensome. In order to be effective the prior art solution requires intervention by a network administrator or the like each time a host is added to the network or when a host is moved from one port to another. In other words the solution requires advance configuration before the network is established and more significantly reconfiguration each time a change in the network takes place.

SUMMARY OF THE INVENTION

The invention contemplates a process for automatically generating a network subnet configuration by monitoring IP Address Resolution Protocol (ARP) frames on the network and building and maintaining a table including a list of learned subnets, the ports associated with each of the learned subnets and a mask associated with each learned subnet for identifying hosts belonging to the subnet. The process includes:

intercepting IP ARP frames;

extracting the source and destination IP addresses from the IP ARP frame;

examining the table of learned subnets to determine if the extracted IP addresses belong to one or more of the learned subnets;

if neither IP address belongs to a learned subnet defining a new learned IP subnet address from the common elements in the prefix of the IP addresses, associating the port over which the ARP frame was received with the learned subnet and generating a mask which includes all of the common elements in the prefixes of both IP addresses;

if only one IP address belongs to a learned subnet, examine the subnet mask and modify it if necessary to only include all the common elements in the prefix of both IP addresses and add the port over which the ARP frame was received to the port list associated with the learned IP subnet if it was not already in the list of associated ports; and, if the IP addresses belong to different learned subnets the learned subnets are combined to form a new learned subnet with a mask which includes both host IP addresses in the learned subnet and the port over which the IP ARP frame was received is added to the ports associated with the new learned subnet.

BRIEF DESCRIPTION OF THE DRAWINGS

FIG. 2 is a representation of the information developed by the invention for controlling the distribution of broadcast frames;

DETAILED DESCRIPTION OF THE INVENTION

IP addresses have a binary format (xxxx xxxx.xxxx xxxx.xxxx xxxx.xxxx xxxx). A typical binary address 1000 1100.1111 1100.0000 0100.0000 0001 can also be expressed in decimal format (140.252.4.1). Both formats will be used in the description which follows. In some instances the IP address will be expressed in mixed format in order to improve clarity.

IP address have a subnet and a host part. While the length of the IP address is fixed there are, however, no constraints on the length allocated to each individual part. Therefore, without advance information it is impossible to determine if two IP addresses are in the same subnet. Fortunately, in bridged IP networks. host systems communicate with other host systems only in the same subnet. If an ARP frame is received at a port. it is reasonable to assume that common prefix bits in both addresses include at a minimum the subnet portion of the IP address. It is possible that two hosts may have common prefix bits which extend beyond the actual subnet address. A learned subnet as used in the specification and claims differs from a subnet as used in the IP protocol since it can and generally will (except for a condition described below) include one or more bits of the IP address which are part of the host portion of the IP address. How the invention accommodates this discrepancy as more and more hosts belonging to the same subnet transmit IP ARP frames will be described below.

Figure 1:
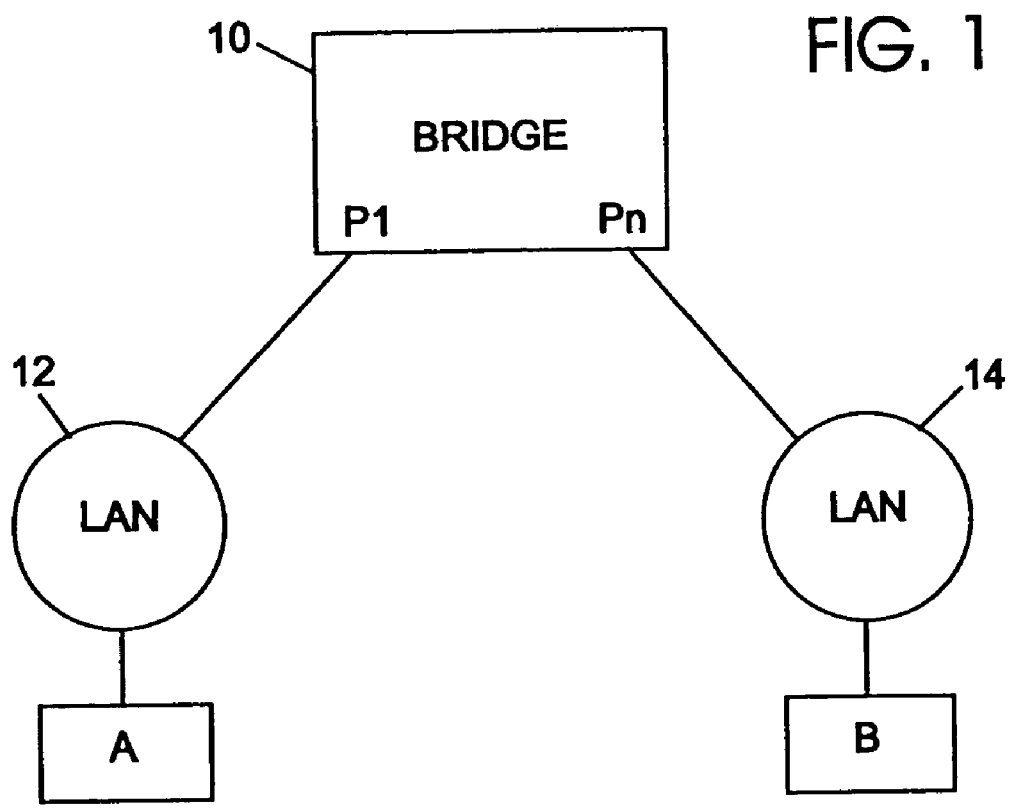
FIG. 1 is a block diagram of a network employing the invention.

A simplified IP bridged network is illustrated in FIG. 1. The network includes a bridge 10 having a number of ports P1–Pn. Token Ring LAN's 12 and 14 are each connected to a different port P in the bridge 10. Two host systems A and B are connected to LAN's 12 and 14, respectively. While the description identifies Token Ring LAN's other equivalent networks will operate in the same manner. In the description which follows one of these hosts will transmit an ARP frame addressed to the other. In the first example, neither host IP address will be identifiable with an established learned subnet and the bridge will establish a learned subnet which includes all or part of their IP addresses. In the second example, Only one of the host IP addresses will be identifiable with an established learned subnet and the bridge will modify the previously established learned subnet to include the other host IP address. In a third example the source and detination host IP addresses of an ARP frame will be identifiable with different learned subnets and the bridge will combine the two different learned subnets into a single learned subnet which will be identifiable with the IP addresses of both hosts. And in a fourth example, an existing learned subnet will be split or reduced.

FIG. 2 illustrates the bridge memory contents for the learned subnet. Each learned subnet will have similar information stored in the memory. A first field labeled address includes that part of the IP address which are common to two or more host systems. A second field includes a mask which defines all of the common prefix bits in the IP addresses of hosts having an IP address which conforms to the first field. A third field includes a list of ports associated with the learned subnet over which broadcast frames originating from hosts belonging to the same learned subnet are transmitted. And a fourth field includes data used for splitting or reducing the learned subnet.

Figure 3:
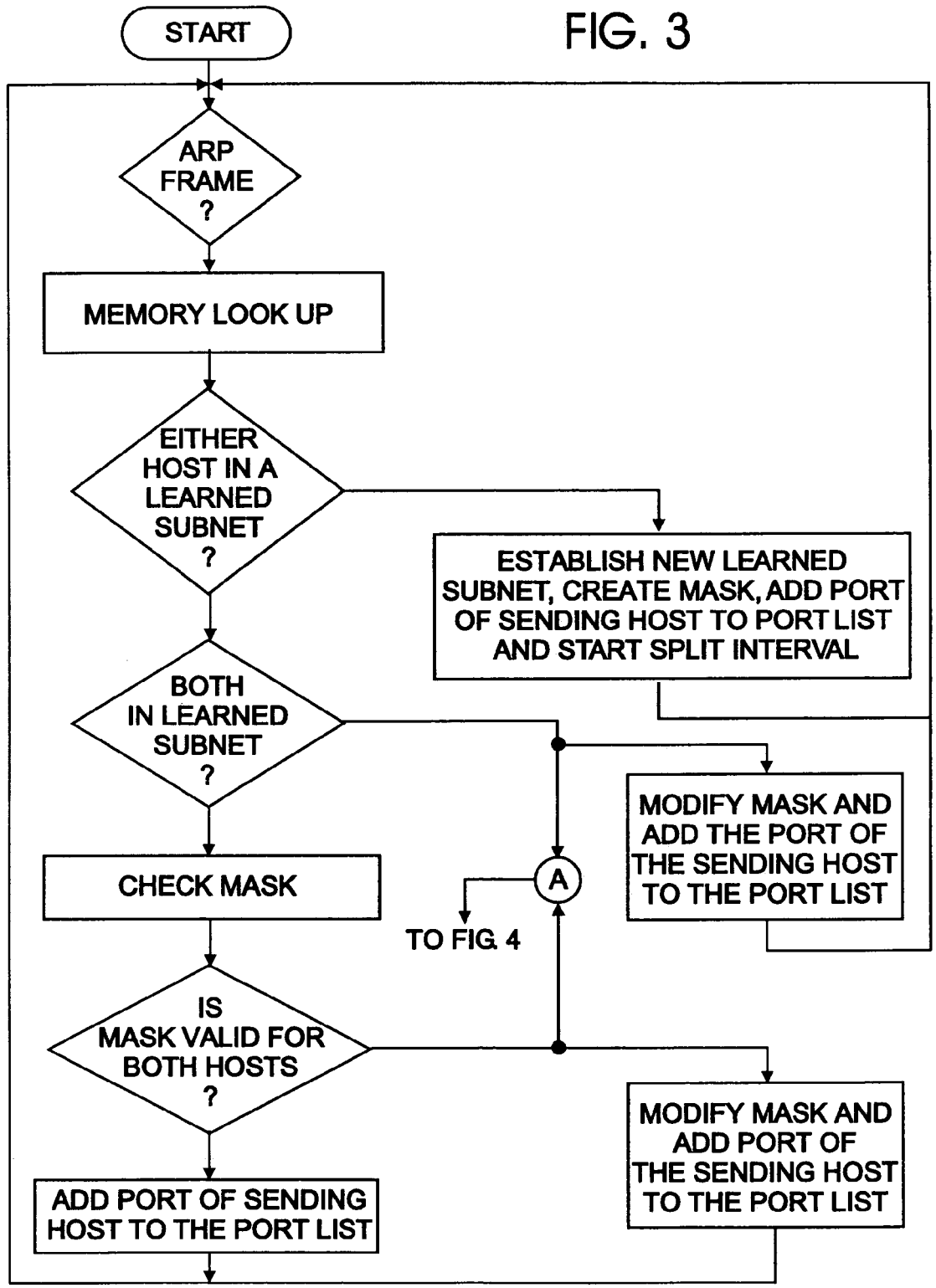
FIG. 3 is a flow chart illustrating the process used for generating the control information; and, FIG. 4 is a flow diagram of an optional process for splitting learned subnets to achieve greater network efficiency.
Figure 4:
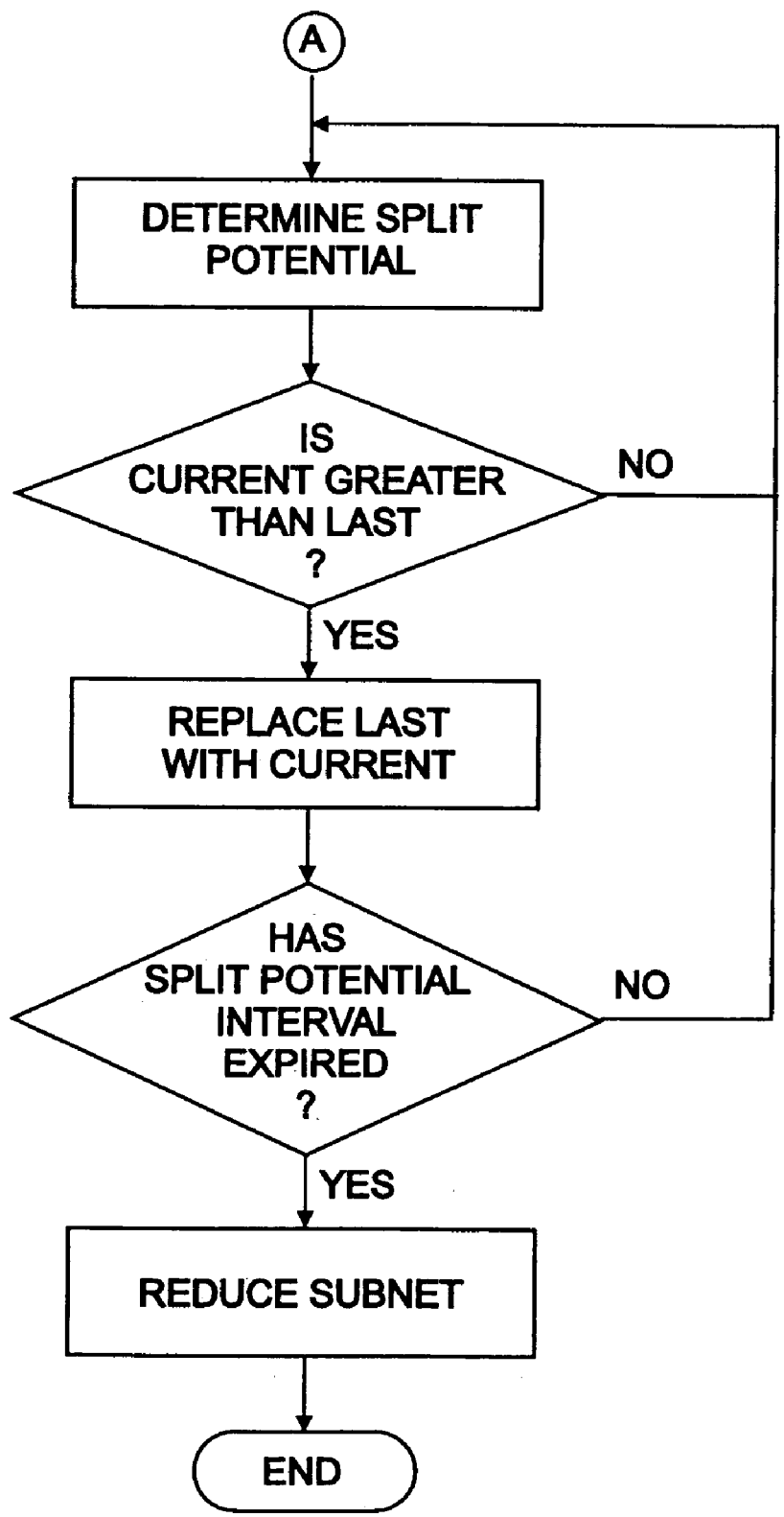

The first three examples set forth below will follow the flow diagram illustrated in FIG. 3 while the fourth will follow the flow diagram illustrated in FIG. 4. In each example host A located on LAN 12 is the source address of an ARP frame received at port $P_1$ and host B located on LAN 14 is the destination address of the ARP frame transmitted by host A.

If neither host A or B belong to any of the learned subnets in the bridge memory, the bridge will create the smallest IP subnet containing both hosts A and B as a new learned subnet. In this instance, the forwarding domain for this new subnet is port P1, the port over which the ARP frame was received. If the ARP frame had originated in host B, the forwarding domain would have been port Pn since this is the port host B is connected to. In all of the cases described below, the forwarding domain is extended to the port over which the ARP frame was received if that port is not already in the forwarding domain.

In this example we will assume that the IP address of host A is 140.252.4.1 (140.252.0000.0100.0000.0001) and the address of host B is 140.252.8.1 (140,252.0000.1000.0000.0001). The associated learned subnet created by the bridge is 140.252.0.0 and the mask is 255.255.240.0 (1111.1111.1111.1111.1111.0000.0000.0000). The common part of the prefix of the two IP addresses 140.252.0000 is set to all one's while the remainder of the mask (the non common part) is set to all zero's. At this time, the memory includes the subnet address 140.252.0.0, the mask 255.255.240.0 and the port P1 in the forwarding domain field. This learned subnet will change over time as more ARP frames are received. How this takes place will become apparent from the description below of the remaining examples.

In the second example we will assume that host A belongs to an existing subnet V (where V stands for a learned subnet stored in the memory of bridge 10 and has the format described above) and that host B does not belong to an existing learned subnet. We will consider the differences when the source of the ARP frame is host A or host B. In this exampe the bridge will modify the learned subnet V by expanding it to include host B. The expanded subnet V1 is structured to include the IP address of host B as well as the IP addresses of the other hosts which have contributed to the generation of the learned subnet V. The forwarding domain of the modified (or replacement) subnet V1 is extended from that of subnet V so as to include the port over which the ARP frame was received if that port was not previously included in the forwarding domain of learned subnet V. If host B was the source of the ARP frame, the forwarding domain of the subnet V is extended to include port Pn if port Pn was not already included in the forwarding domain of the learned subnet. If host A was the source of the ARP frame, the forwarding domain of the subnet V1 is extended to port P1 if that port was not already included in the forwarding domain of the learned subnet.

In this example we will assume that the learned subnet V is characterized by the address 140.252.0.0 with a mask 255.255.248.0 (1111.1111.1111.1111.1111.1000.0000.0000) and the IP addresses of hosts A and B are 140.252.4.1 (140.252.0000.0100.0000.0001) and 140.252.8.1 (140,252.0000.1000.0000.0001), respectively. In this example host A belongs to learned subnet V and host B does not belong to any of the learned subnets. Since one of the hosts is sending an ARP frame to the other (it makes no difference which host initiated the ARP frame) it implies that both hosts belong to the same subnet. In view of this all that is required in modifying subnet V is to modify the mask so that it includes both host A and B and extend the forwarding domain of the modified subnet V1 to include the port of the source of the ARP frame if that port was not already included in the original subnet V. In order to accommodate both hosts A and B the mask of subnet V is changed to 255.255.240.0 (1111.1111.1111.1111.1111.0000.0000.0000).

In a third example hosts A and B belong to different existing learned subnets Va and Vb, respectively. In this case the bridge creates a new subnet Vc which is the smallest superset of Va and Vb and deletes all of the other subnets that are contained in Vc. The forwarding domain of learned subnet Vc is the union of the forwarding domains of learned subnets Va and Vb and the port over which the ARP frame was received if that port is not already included in one of the forwarding domains of learned subnets Va or Vb. Subnet Vc will serve as the associated subnet for the given ARP frame.

In this example we will assume that the IP address of host A is 140.252.4.1 (140.252.0000.0100.0000.0001), that it belongs to learned subnet Va that is characterized by the address 140.252.4.0 and the mask 255.255.252.0 (1111.1111.1111.1111.1111.1100.0000.0000). That the address of host B is 140.252.8.1 (140,252.0000.1000.0000.0001), that it belongs to learned subnet Vb that is characterized by the address 140.252.8.0 and the mask 255.255.248.0 (1111.1111.1111.1111.1111.1000.0000.0000). Hosts A and B belong to different learned subnets (Va and Vb), however, since host A is sending an ARP frame to host B, it implies that they are in the same subnet and that the learned subnets Va and Vb should be combined into a single learned subnet which accommodates both hosts and includes a forwarding domain which extends to all the different ports included in subnets Va and Vb as well as the port over which the ARP frame was received if that port was not previously included. In this example the merged subnet Vc is characterized by the address 140.252.0.0 and the mask 255.255.248.0 (1111.1111.1111.1111.1111.1000.0000.0000) which includes host A and host B.

If no other action is taken the learned subnets created by the method disclosed above will eventually gravitate to the actual subnets specified in the IP address. This will occur over time as hosts within an actual subnet transmit ARP frames that initiate mergers of learned subnets as described in the third example above.

However, in certain applications of the invention it may be desirable to split or reduce learned subnets as well as merge learned subnets. As learned subnets are merged, there is an increase in the forwarding domain of the learned subnet and a consequent increase in the number of ports included in the forwarding domain of the merged learned subnet. Under certain conditions (such as network configuration, host applications . . . ) large learned subnets with large forwarding domains can result in reduced network efficiency. As illustrated in the third example, the learned subnet Vc has a smaller number of IP address prefix bits included in its mask in order to accommodate a larger number of host systems in the learned subnet and it also includes a larger forwarding domain (the sum of the ports included in Va and Vb). Mergers may at times occur as a result of transient traffic anomalies. However, once established they continue and impact network performance as described above.

In a fourth example described below, a learned subnet will be split or reduced when a derived split potential for the learned subnet indicates that the learned subnet is a candidate for spliting. In this example, hosts A and B belong to the same subnet V. The split or reduction will not take place until after the expiration of a split interval which starts with the creation of a learned subnet and ends after a predetermined delay. The length of the interval is set to accommodate the characteristics of the network. As each ARP frame associated with a learned subnet is received, the bridge determines the split potential and replaces a previously determined split potential if it is greater than the previously determined split potential. The split potential is the difference in the length in bits between the current mask and the mask required to accommodate the hosts in the current ARP frame.

In the example described below it will be assumed that the existing subnet V is characterized by the address 140.252.0.0 and has a mask 255.255.192.0 (1111 1111.1111 1111.1100 0000.0000 0000). Both hosts A and B engaged in an ARP frame belong to subnet V. The address of host A is 140.252.4.1 (140.252.0000 0100.0000 0001) and the address of host B 140.252.8.1 (140.252.0000 1000.0000 0001).

The bridge will after receiving the ARP frame described above determine the split potential for subnet V by identifying the common prefix bits in the addresses of hosts A and B. In this case there are 20 common prefix bits in the addresses of hosts A and B. A mask based on this value exceeds the length of the current mask for subnet V by two bits yielding a split potential value of two. If the value exceeds a previously determined split potential value it replaces the previously determined value. If a new value of the split potential exceeds a previously determined value, the characterizing address (140.252.0.0), the mask (255.255.240.0) and the port over which the ARP frame was received are stored in memory for future use. At the expiration of the split interval, the split potential is examined and if it exceeds zero the subnet V assumes the stored characterizing address and mask. At this time the forwarding domain of the subnet V is modified to include only the stored port over which the ARP frame used to determine the split potential was received.

While one basis for splitting or reducing a subnet has been described in detail it will be obvious to those skilled in this art that other network operational factors can be used or included in the determination of the split potential value. In addition, the reduction in the number of ports included in the reduced subnet can be enlarged to take into account past performance in network traffic.

While the invention is susceptible to various modifications and alternative forms, specific embodiments have been shown in detail by way of example. It should be obvious to those skilled in the art to which the invention pertains that the invention is not limited to the specific embodiments descried and illustrated, but on the contrary, the invention is intended to cover all alternatives, modifications and equivalents falling within the spirit and scope of the invention as defined by the claims.

We claim:

1. A method for automatically generating a network subnet configuration:
    establishing and maintaining in memory a table of learned IP subnets, each of which includes a characterizing learned subnet address, a mask for identifying IP address bits common to all members of the learned subnet and the forwarding port of the subnet;
    intercepting IP ARP frames;
    extracting source and destination IP addresses from an intercepted IP ARP frame;
    examining the table of learned subnets to determine if the extracted IP addresses belong to one or more of the learned subnets;
    if neither IP address belongs to a learned subnet, defining a new learned IP subnet address for inclusion in the table stored in the memory from the common elements in the prefix of the IP addresses, including the port over which the ARP frame was received in the forwarding domain of the learned subnet and generating a mask which identifies all of the common elements in the prefixes of both IP addresses.

2. The method of claim 1 wherein the table further includes ports associated with each of the learned subnets and a second mask associated with each of the learned subnets to identify hosts belonging to each of the learned subnets.

3. A method for automatically generating a network subnet configuration by monitoring IP Address Resolution Protocol (ARP) frames on the network and building and maintaining a table including a list of learned subnets, the ports associated with each of the learned subnets and a mask associated with each learned subnet for identifying hosts belonging to the subnet, said method including:
    establishing and maintaining in memory a table of learned IP subnets, each of which includes a characterizing learned subnet address, a mask for identifying the IP address bits common to all members of the learned subnet and the forwarding domain of the subnet;
    intercepting IP ARP frames;
    extracting the source and destination IP addresses from an intercepted IP ARP frame;
    examining the table of learned subnets to determine if the extracted IP addresses belong to one or more of the learned subnets;
    if neither IP address belongs to a learned subnet, defining a new learned IP subnet address for inclusion in the table stored in the memory from the common elements in the prefix of the IP addresses, including the port over which the ARP frame was received in the forwarding domain of the learned subnet and generating a mask which identifies all of the common elements in the prefixes of both IP addresses;
    if only one IP address belongs to a previously learned subnet, examine the subnet mask and modify it include all the common elements in the prefix of both IP addresses in the ARP frame; and
    add the port over which the ARP frame was received to the port list associated with the learned IP subnet if it was not already in the list of associated ports.

4. The method set forth in claim 3 including:
    if the IP addresses in the received ARP frame belong to different learned subnets;
    combine the learned subnets to form a new learned subnet create a new mask which includes the common prefix IP address elements of both host IP addresses engaged in the ARP frame; and add the port over which the IP ARP frame was received to the combined forwarding domains of the previously identified subnets if that port was not included therein.

5. A method for automatically generating a network subnet configuration by monitoring IP Address Resolution Protocol (ARP) frames on the network and building and maintaining a table including a list of learned subnets, ports associated with each of the learned subnets and a mask associated with each of the learned subnets for identifying hosts belonging to each of the learned subnets, said method including:

maintaining in memory a table of learned IP subnet addresses, each of which includes a characterizing address, a mask for the IP address bits common to all members of the learned subnet and the forwarding domain of the subnet;

intercepting IP ARP frames;

extracting source and destination IP addresses from an intercepted IP ARP frame;

examining the table of learned subnets to determine if the extracted IP addresses belong to one or more of the learned subnets;

if neither IP address belongs to a learned subnet, defining a new learned IP subnet address for inclusion in the table stored in the memory from the common elements in the prefix of the IP addresses, including the port over which the ARP frame was received in the forwarding domain of the learned subnet and generating a mask which identifies all of the common elements in the prefixes of both IP addresses;

if only one IP address belongs to a learned subnet, examine the subnet mask and modify it if necessary to only include all the common elements in the prefix of both IP addresses and add the port over which the ARP frame was received to the port list associated with the learned IP subnet if it was not already in the list of associated ports; and if the IP addresses belong to different learned subnets the learned subnets are combined to form a new learned subnet with a mask which includes both host IP addresses in the learned subnet and add the port over which the IP ARP frame was received to the combined forwarding domains of the previously identified subnets if that port was not included therein.

6. The method set forth in claim 5 including:

upon establishing a new learned subnet starting a split interval timer;

upon receipt of each ARP frame belonging to the subnet generating a split potential value for the learned subnet which is related to the number of common bits in the source and destination IP addresses in the received ARP frame and replacing a previously generated split potential value if the current value exceed a previously generated value; and at the expiration of the split interval, splitting the learned subnet if the split potential exceeds a predetermined value.

7. The method set forth in claim 6 in which the forwarding domain of the split learned subnet includes the port over which the ARP frame causing the last split potential was received.

* * * * *